United States Patent [19]

Raloff

[11] Patent Number: 4,554,432
[45] Date of Patent: Nov. 19, 1985

[54] COMPONENTS FOR GAS METAL ARC WELDING GUN

[75] Inventor: Valgene E. Raloff, Grant Park, Ill.

[73] Assignee: Dover Corporation, New York, N.Y.

[21] Appl. No.: 658,121

[22] Filed: Oct. 5, 1984

[51] Int. Cl.⁴ ............................................. B23K 9/16
[52] U.S. Cl. .............................. 219/137.43; 219/74; 219/137.44
[58] Field of Search ............... 219/74, 137.31, 137.43, 219/137.44, 137.61

[56] References Cited

U.S. PATENT DOCUMENTS

| | | | |
|---|---|---|---|
| 3,514,570 | 5/1970 | Bernard et al. | 219/137.61 |
| 3,536,888 | 10/1970 | Borneman | 219/137.44 |
| 3,731,048 | 5/1973 | Ogden, Sr. et al. | 219/74 |

*Primary Examiner*—C. L. Albritton
*Assistant Examiner*—Alfred S. Keve
*Attorney, Agent, or Firm*—Willian, Brinks, Olds, Hofer, Gilson & Lione Ltd.

[57] ABSTRACT

A gas metal arc welding gun includes a power cable in which the power conductors are asymmetrically distributed in a crescent between a gas conduit and a sheath in order to improve flexibility of the power cable. The welding gun includes a head assembly which includes a head that defines an internal annular ridge between a contact tip and a free end of an electrode liner. This annular ridge serves as a stop for the contact tip, as a centering guide for the electrode liner, and as a shield to protect the electrode from welding spatter. The welding gun includes a two-piece handle which includes a tongue and aperture guide at one end, and an interlocking flange guide at the other end. The two guides restrict movement between the two housing parts to axial movement, and a snap ring locks the two housing parts in a desired assembled position.

6 Claims, 13 Drawing Figures

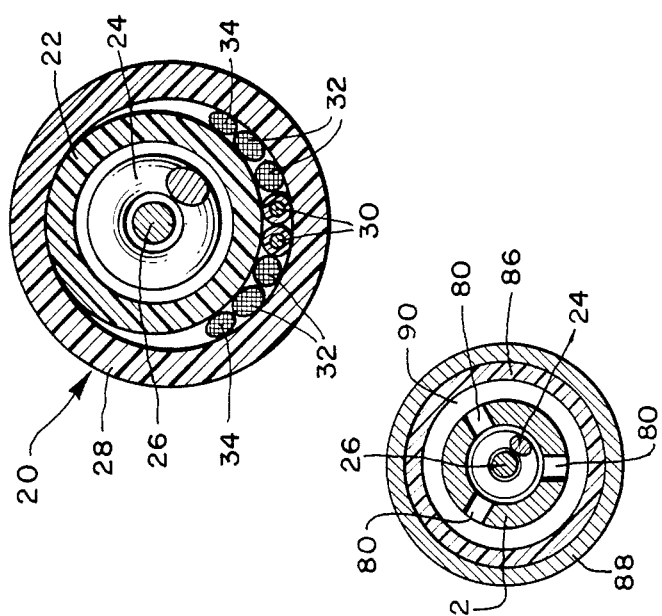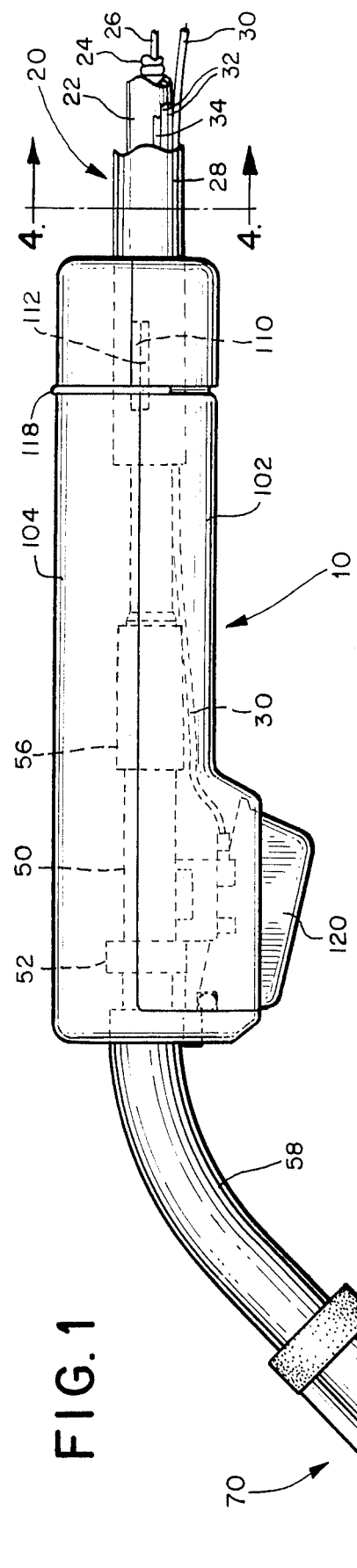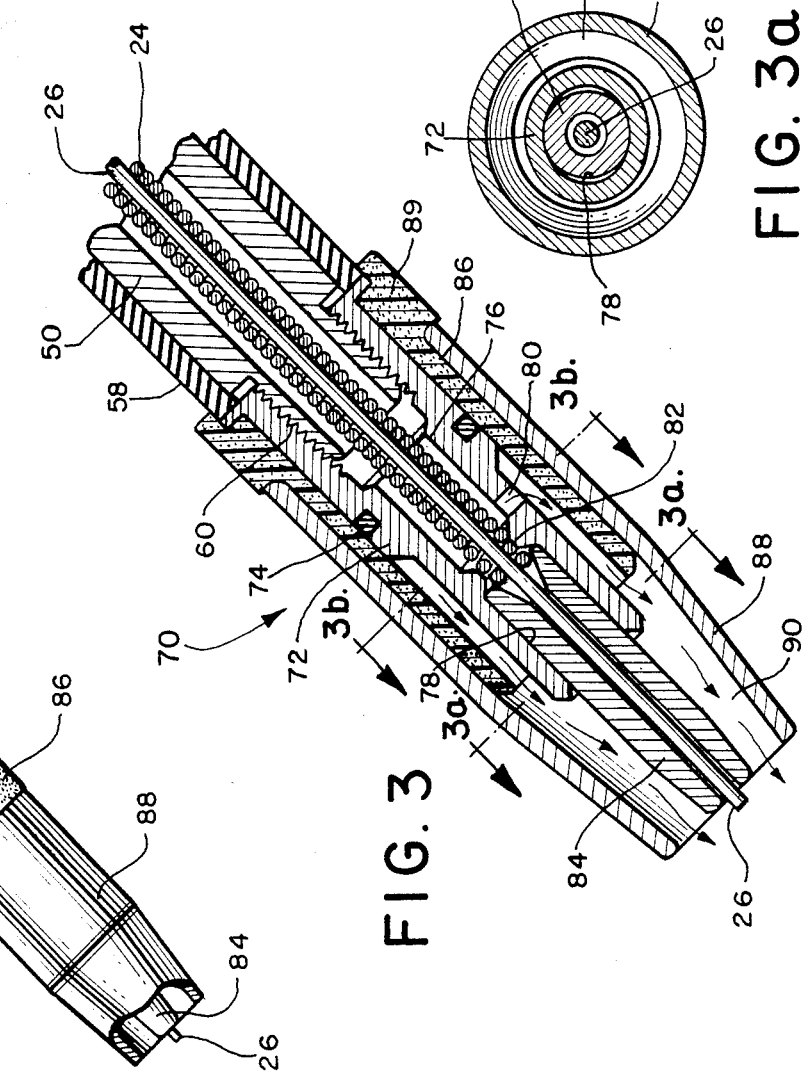

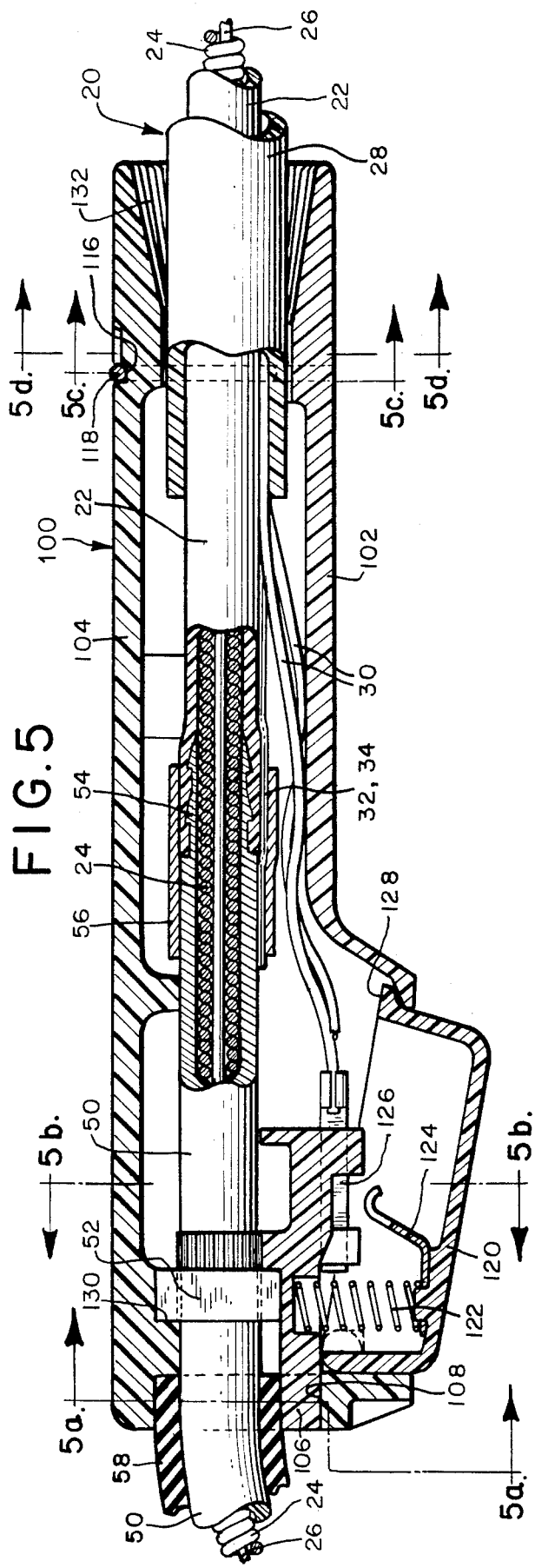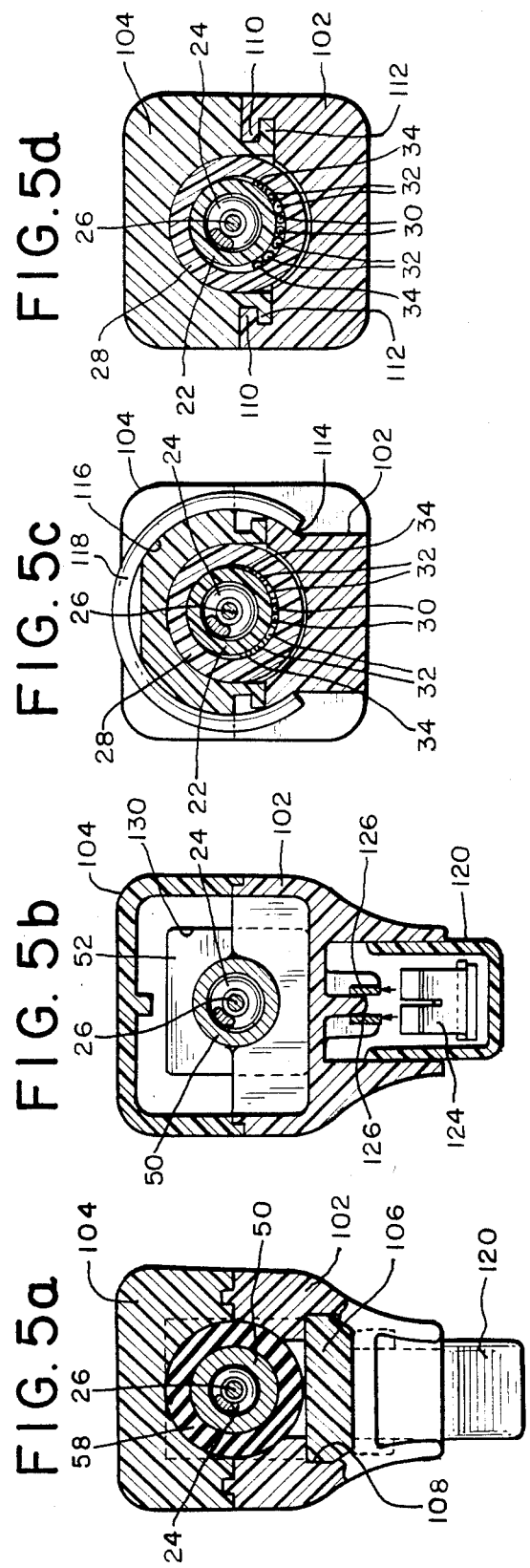

COMPONENTS FOR GAS METAL ARC WELDING GUN

BACKGROUND OF THE INVENTION

The present invention relates to improvements to gas metal arc welding guns.

Gas metal arc welding guns have been in widespread use for some time. U.S. Pat. Nos. 4,250,366 and 4,270,824, assigned to the assignee of the present invention, disclose one prior art welding gun of this type. Although well suited to a wide variety of applications, this welding gun is not without its drawbacks. In particular, there is a need for a small, lightweight welding gun which incorporates a number of improvements over this prior art device.

SUMMARY OF THE INVENTION

The present invention is directed to a number of improvements to gas metal arc welding guns that can be used, either alone or in combination, to improve welding performance and in some cases to improve flexibility and reduce weight of welding guns of the type described above. In the preferred embodiment described below, three separate improvements have been combined in a particularly effective welding gun. These improvements relate to an improved power cable, an improved head assembly, and an improved handle.

The improved power cable of this invention utilizes an inner gas conduit shaped to conduct gas to the welding gun, along with an outer conduit or sheath which is disposed around the inner conduit. A plurality of power conductors are assymetrically disposed between the inner and outer conduits such that at a cross-section of the power cable all of the power conductors are grouped in a crescent centered on one side of the center line of the outer conduit, and the inner conduit is displaced to the other side of the center line in order to enhance flexibility of the power cable. In alternate embodiments, the power conductors can either extend parallel to one another along the length of the power cable, or they can be wound in an open helix. In either case, a particularly lightweight, inexpensive and flexible power cable is provided.

The improved head assembly of this invention includes a hollow element which defines a first recess sized to receive a contact tip, a second recess sized to receive an electrode liner, and an internal, annular ridge disposed between the first and second recesses. At least one gas port extends through the hollow element intersecting the second recess to direct a gas from the second recess to a region between a gas nozzle and the contact tip. This annular ridge operates simultaneously to provide a stop for the contact tip, to center the electrode liner, and to protect the contact tip and electrode from welding spatter. In the past, welding spatter has had a tendency to clog such contact tips via the gas ports, thereby interfering with proper feed of the electrode through the head assembly. The annular ridge of the head member of this invention operates effectively and reliably to reduce spatter clogging of the contact tip.

The handle of this invention includes first and second housing shells, each of which defines axially spaced guide segments as well as respective locking ring recesses. In the preferred embodiment described below, one set of guide segments comprises an interlocking tongue and aperture, and the other set of guide segments comprises interlocking guide flanges. In assembly, the respective guide segments are engaged with one another, and the two housing shells are shifted axially until the locking ring recesses are in axial alignment. A locking ring is then placed in the locking ring recesses to prevent further axial movement between the first and second housing shells. Thus, the guide segments prevent relative movement between the first and second housing shells in other than an axial direction, and the locking ring prevents axial movement between the housing shells. In this way, a particularly simple, effective and readily assembled handle is provided.

The invention itself, together with further objects and attendant advantages, will best be understood by reference to the following detailed description, taken in conjunction with the accompanying drawings.

BRIEF DESCRIPTION OF THE DRAWINGS

FIG. 1 is a side view of a gas metal arc welding gun which incorporates a presently preferred embodiment of this invention.

FIG. 3 is a longitudinal sectional view of the head assembly of the welding gun of FIG. 1.

FIGS. 3a and 3b are a cross-sectional views taken along the respective lines of FIG. 3.

FIG. 4 is a cross-sectional view taken along line 4—4 of FIG. 1.

FIG. 5 is a longitudinal sectional view of the handle and related components of the welding gun of FIG. 1.

FIGS. 5a–5d are cross-sectional views taken along the respective lines of FIG. 5.

DETAILED DESCRIPTION OF THE PRESENTLY PREFERRED EMBODIMENTS

Figure 2:
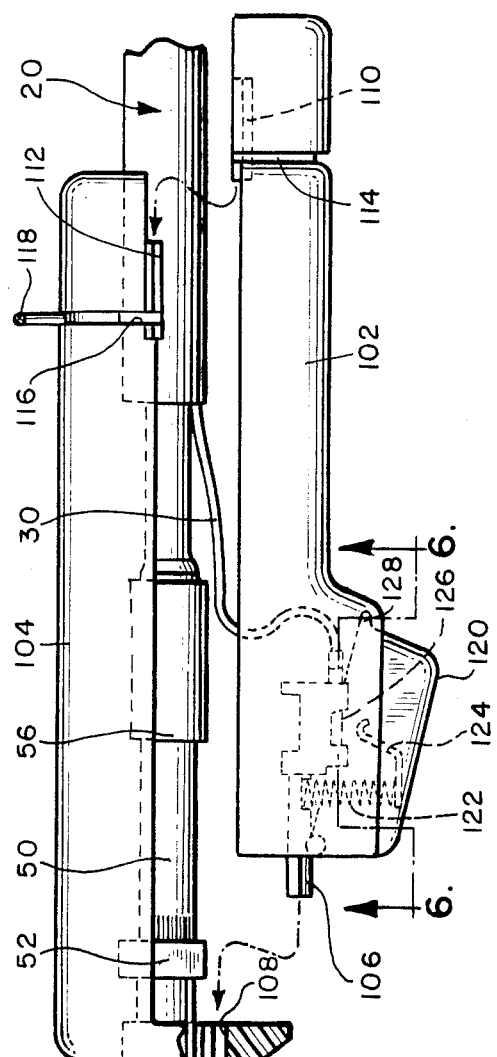
FIG. 2 is an exploded view of the welding gun of FIG. 1.

Turning now to the drawings, FIGS. 1–7 show various views of a presently preferred embodiment of the gas metal arc welding gun of this invention. This embodiment 10 includes preferred embodiments of the power cable 20, the head assembly 70, the insulator 86, and the handle 100 of this invention.

As well known to those skilled in the art, a gas metal arc welding gun receives electrical current, a supply of a shielding gas, and a wire electrode via a power cable. The supply of the electrical current, the shielding gas, and the electrode wire is controlled by a trigger on the welding gun. By properly holding the welding gun and manipulating the trigger, an electrical arc is created between the free end of the electrode and the workpiece, and the welding operation is shielded from atmospheric contamination by the gas.

FIGS. 1 and 4 provide detailed views of the power cable 20 of this embodiment. This power cable 20 includes a gas conduit 22 which is impermeable to gas and which is sized to receive an electrode liner 24. The electrode liner 24 is a tightly wound coil spring which receives an electrode wire 26. The gas conduit 22, the electrode liner 24, and the electrode 26 are all standard prior art components which do not per se form part of this invention. The gas conduit 22 is surrounded by an insulating conduit or sheath 28. As shown in FIG. 4, a pair of control leads 30 and a number of power conductors 32,34 are arranged in a crescent between the sheath 28 and the gas conduit 22. This crescent extends over less than 180° and is disposed entirely on one side of the center line of the sheath 28. In this embodiment, the control leads 30 and the power conductors 32,34 extend parallel to one another along the entire length of the power cable 20. Alternately, the control leads 30 and the power conductors 32,34 can be coiled loosely in an open helix.

The power conductors 32,34 serve to conduct current from an external current source (not shown) to the welding gun. Similarly, the gas conduit 22 conducts a shielding gas from an external gas source (not shown) to the welding gun, and the electrode liner 24 conducts the electrode 26 from an external supply mechanism (not shown) to the welding gun. The assymetric distribution of the control leads 30 and the power conductors 32,34 with respect to the sheath 28 has been found to provide a flexible power cable 20 which is particularly well suited for use with small welding guns.

As best shown in FIG. 5, the welding gun 10 includes a body tube 50 formed of a conductive metal. A square nut 52 is pressfit onto the exterior of the body tube 50 for mounting purposes described below. One end of the body tube 50 defines a gas barb 54 sized to fit into and seal against the gas conduit 22. The interior passageway of the body tube 50 is sized to receive the electrode liner 24 and to conduct both the electrode 26 and the shielding gas to the head assembly 70. A crimp sleeve 56 is used to crimp the power conductors 32,34 to the outside of the body tube 50, thereby establishing both mechanical and electrical contact between the body tube 50 and the power conductors 32,34. In addition, the crimp sleeve 56 secures the gas conduit 22 to the gas barb 54 mechanically. The exposed portion of the body tube 50 is surrounded by an elastomeric insulator 58, and terminates in a threaded end 60.

As shown in FIGS. 2 and 3, the threaded end 60 of the body tube 50 serves to support a head assembly 70. This head assembly 70 includes a head 72 which defines a bore threadedly engaged with the threaded end 60. A metal snap ring 74 is mounted on the exterior of the head 72 for use with other types of insulators, and the head 72 defines two axially aligned recesses: a liner bore 76 sized to receive the electrode liner 24, and a contact tip bore 78 sized to receive a contact tip 84. Three gas ports 80 are defined by the head 72, each proceeding outwardly from the liner bore 76. An annular ridge 82 is positioned at the junction of the liner bore 76 and the contact tip bore 78.

Preferably, the contact tip 84 is oval in cross-section, as described in U.S. Pat. No. 3,514,570, assigned to the assignee of the present invention. Similarly, the contact tip bore 78 is out of round, as shown in an exaggerated form in FIG. 3a, such that the contact tip 84 can be locked in place by twisting it relative to the head 72. The annular ridge 82 acts simultaneously to center the electrode liner 24 and as a stop for the contact tip 84. In this preferred embodiment, the head 72 is formed of a conductive metal and the contact tip 84 is formed of copper or a copper alloy. As shown in FIG. 3, the electrode 26 extends through the electrode liner 24, which is held on center by the ridge 82, and on through an internal bore of the contact tip 84.

A gas nozzle insulator 86 is sized to fit around the exterior of the head 72 in frictional engagement therewith. This insulator 86 defines a raised ring 89 at the rear end thereof. A gas nozzle 88 formed of a suitably rigid metallic material is frictionally engaged on the insulator 86. The gas nozzle 88 cooperates with the head 72 and the contact tip 84 to define an annulus 90 therebetween. Shielding gas which has flowed through the body tube 50 passes into the liner bore 76, out of the gas ports 80, and through the annulus 90 to the region of the free end of the electrode 26.

As shown in FIG. 5, a handle 100 is disposed around the end of the body tube 50 adjacent to the power cable 20. This handle 100 is formed of first and second housing shells 102,104, which cooperate to surround the junction between the power cable 20 and the body tube 50.

The first housing shell 102 defines a tongue 106 which is sized to fit within an opening 108 defined by the second housing shell 104 (as shown in FIGS. 5 and 5a). Similarly, the first housing shell 102 defines a set of two parallel guide flanges 110 which are shaped to mate and interlock with a second set of guide flanges 112 defined by the second housing shell 104 (as shown in FIGS. 5c and 5d). The housing shells 102,104 also define respective grooves 114,116 sized to receive a locking ring 118.

The tongue 106 and opening 108 form a first axial guide, axially separated from the guide flanges 110,112 which form a second axial guide. These two axial guides cooperate to restrain the respective ends of the housing shells 102,104 and to restrict them to axial motion.

Figure 6:
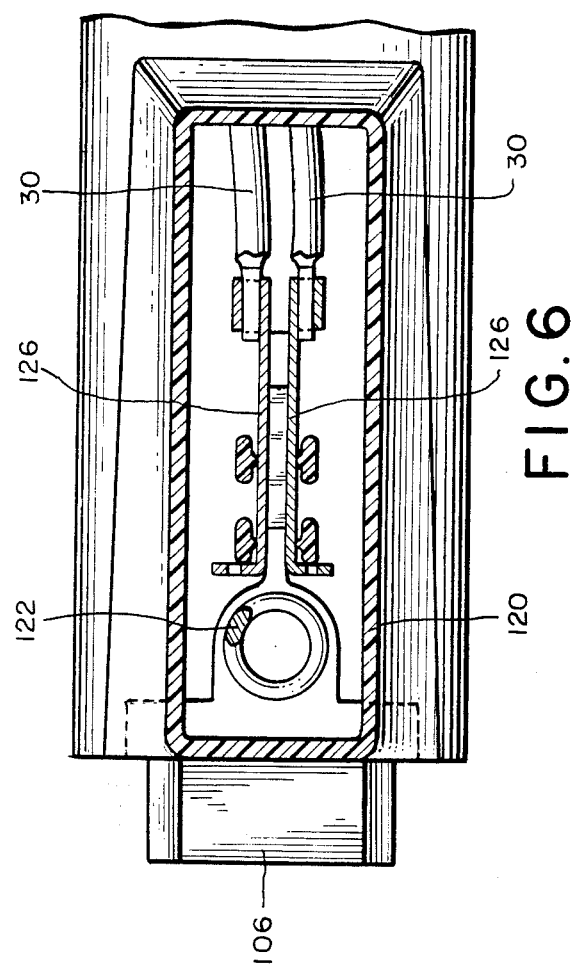
FIG. 6 is a sectional view taken along line 6—6 of FIG. 2.
Figure 7:
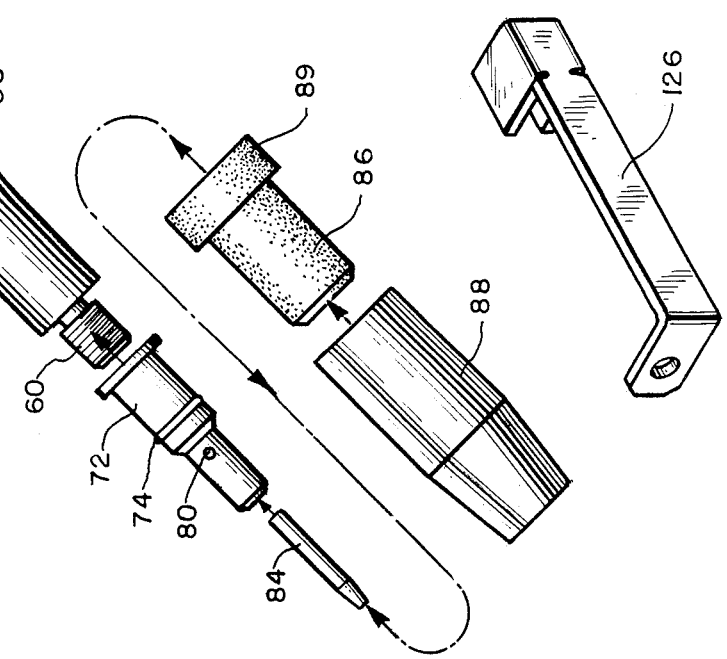
FIG. 7 is a perspective view of a blade element included in the embodiment of FIG. 1.

A trigger 120 is pivotably mounted to the first housing shell 102, and is biased into an outer position by a coil spring 122. A stop 128 limits the outer movement of the trigger 120. A spring contact 124 is mounted to the interior of the trigger 120, and the spring contact 124 is positioned to contact and create a short circuit between two blades 126 fixedly mounted to the first housing shell 102. Each of the blades 126 is crimped to a respective one of the control leads 30. Thus, as the trigger 120 is depressed, the contact 124 electrically interconnects the two blades 126 and thereby the two control leads 30. It should be noted that in this preferred embodiment the contact 124 has been designed to wipe across the length of the blades 126 as the trigger 120 is depressed. This wiping action serves to clean and create good electrical contact between the blades 126 and the contact 124, even in the adverse environment to which the welding gun is subjected. FIGS. 5b and 6 show the positioning of the blades 126 and the contact 124 in particular detail.

When assembled, the handle 100 defines a square recess 130 sized to receive the nut 52. The body tube 50 can be rotated to any one of four orientations with respect to the handle 100, and the nut 52 and the recess 130 cooperate to preserve the selected angular orientation. In addition, the assembled housing 100 defines a ridged or fluted bell 132 at the end adjacent to the power cable 20. The ridges or flutes in the bell 132 allow cooling air to enter the handle 100. The outwardly flared shape of the bell 132 provides strain relief to the power cable 20.

The preferred embodiment described above utilizes the following component materials. It should be clearly understood, however, that these component materials are provided merely by way of illustration, and that a wide range of alternative materials can also be used. In this preferred embodiment, the control leads 30 are 20AWG conductors insulated with crosslinked polyethylene sheaths. The larger power conductors 32 are each formed of 105 individual 34 gauge copper wires, and are each 0.070 inches in diameter. Similarly, the smaller power conductors 34 are each formed of 82 individual 34 gauge copper wires, and are each 0.065 inches in diameter. The gas conduit 22 is formed of a synthetic material such as the material available from Monsanto under the trade name Santoprene having a hardness of 80A durometer. Similarly, the sheath 28 is formed of a material such as Santoprene having a hardness of 73A durometer.

The housing shells 102,104 can be formed of any suitable material such as ABS thermoplastic, and the spring contact 104 can be formed of any suitable spring material such as spring brass alloy 260 having a hardness of Rockwell B89/93.

The welding gun described above can be assembled in a particularly simple and straightforward manner. After the power conductors 32,34 have been crimped by the sleeve 56 onto the body tube 50 and the control leads 30 have been connected to the blades 126, the housing 100 can be assembled by axially sliding the tongue 106 into the opening 108 and the guide flanges 110,112 together until the grooves 114,116 are in axial alignment. Then the locking ring 118 is snapped in place in order to complete assembly of the handle 100. No threaded fasteners of any type are required and a particularly simple and reliable handle results. The ridge 82 cooperates with the liner 24 to protect the electrode 26 from clogging by welding spatter travelling up the interior of the gas nozzle 88. The assymetric placement of the power conductors 32,34 in the power cable 20 provides a particularly flexible and kink-free power cable.

Of course, it should be understood that a wide range of changes and modifications can be made to the preferred embodiment described above. In particular, individual improvements included in the welding gun described above can be used either in combination as described above, or separately from one another. In addition, materials, dimensions and proportions can be adapted as necessary to particular applications. It is therefore intended that the foregoing detailed description be regarded as illustrative rather than limiting, and that it be understood that it is the following claims, including all equivalents, which are intended to define the scope of this invention.

I claim:

1. In a gas metal arc welding gun of the type comprising a contact tip, a gas nozzle around the contact tip, and an electrode liner positioned to direct an electrode to the contact tip, the improvement comprising:

a head member which defines a first recess sized to receive the contact tip, a second recess sized to receive the electrode liner, an internal, annular ridge which defines a restricted diameter passageway between the first and second recesses, and at least one gas port through the head member intersecting the second recess to direct a gas from the second recess to a region between the gas nozzle and the contact tip;

said passageway sized to pass the electrode liner therethrough to allow the electrode liner to contact the contact tip directly;

said annular ridge operating simultaneously to provide a stop for the contact tip, to center the electrode liner, and to protect the electrode from welding spatter.

2. The invention of claim 1 wherein the first and second recesses are shaped as coaxial bores.

3. The invention of claim 1 wherein the annular ridge defines an inclined surface adjacent the second recess to guide the electrode liner into the passageway.

4. A head member for a gas metal arc welding gun of the type comprising a contact tip, a gas nozzle around the contact tip, and an electrode liner positioned to direct an electrode to the contact tip, said head member comprising:

a hollow element which defines a first recess sized to receive the contact tip, a second recess sized to receive the electrode liner, an internal, annular ridge which defines a restricted diameter passageway between the first and second recesses, and at least one gas port intersecting the second recess to direct a gas from the second recess to a region between the gas nozzle and the contact tip;

said passageway sized to pass the electrode liner therethrough to allow the electrode liner to contact the contact tip directly;

said annular ridge operating simultaneously to provide a stop for the contact tip, to center the electrode liner, and to protect the electrode from welding spatter.

5. The invention of claim 4 wherein the first and second recesses are shaped as coaxial bores.

6. The invention of claim 4 wherein the annular ridge defines an inclined surface adjacent the second recess to guide the electrode liner into the passageway.

* * * * *